US012776498B2

(12) United States Patent
Yui et al.

(10) Patent No.: US 12,776,498 B2
(45) Date of Patent: Oct. 27, 2026

(54) GASKET FOR FUEL CELL

(71) Applicant: NOK CORPORATION, Tokyo (JP)

(72) Inventors: Hajime Yui, Fujisawa (JP); Shigeru Watanabe, Fujisawa (JP); Takeshi Masaka, Kikugawa (JP)

(73) Assignee: NOK CORPORATION (JP)

( * ) Notice: Subject to any disclaimer, the term of this patent is extended or adjusted under 35 U.S.C. 154(b) by 747 days.

(21) Appl. No.: 18/189,368

(22) Filed: Mar. 24, 2023

(65) Prior Publication Data

US 2023/0317978 A1 Oct. 5, 2023

(30) Foreign Application Priority Data

Mar. 29, 2022 (JP) ................................ 2022-053286

(51) Int. Cl.
*H01M 8/0282* (2016.01)
*H01M 8/021* (2016.01)
*H01M 8/0254* (2016.01)

(52) U.S. Cl.
CPC ......... *H01M 8/0282* (2013.01); *H01M 8/021* (2013.01); *H01M 8/0254* (2013.01)

(58) Field of Classification Search
CPC .. H01M 8/0282; H01M 8/021; H01M 8/0254; H01M 8/0276; H01M 8/0286
See application file for complete search history.

(56) References Cited

U.S. PATENT DOCUMENTS

2008/0134496 A1 6/2008 Bae
2020/0381759 A1 12/2020 Kajiwara et al.

FOREIGN PATENT DOCUMENTS

CN 101202336 A 6/2008
CN 110541144 A 12/2019
JP 2005-032577 A 2/2005
JP 2006228533 A * 8/2006
JP 2006309989 A * 11/2006
JP 2020-198200 A 12/2020
JP 2021-086757 A 6/2021

OTHER PUBLICATIONS

English translation of JP-2006228533-A (Year: 2006).*
English translation of JP-2006309989-A (Year: 2006).*
Notice of Reasons for Refusal for corresponding Japanese Patent Application No. 2022-053286 dated Nov. 25, 2025, with English translation (8 Pages).

* cited by examiner

*Primary Examiner* — Ula C Ruddock
*Assistant Examiner* — Sarika Gupta
(74) *Attorney, Agent, or Firm* — Harness, Dickey & Pierce, P.L.C.

(57) ABSTRACT

A gasket includes a first separator having a first bead, and a second separator superposed with the first separator and having a second bead formed at a position opposite to the first bead, wherein the first separator further has a first protrusion disposed close to the first bead and protruding from a first separator front surface in the same direction as the protruding direction of the first bead, and the second separator further has a second protrusion disposed close to the second bead, protruding from a second separator rear surface in a direction opposite to the protruding direction of the second bead, and fittable to the first protrusion.

10 Claims, 6 Drawing Sheets

GASKET FOR FUEL CELL

RELATED APPLICATIONS

The present application is an application based on JP 2022-053286 filed on Mar. 29, 2022 with Japan Patent Office, the entire contents of which are incorporated herein by reference.

BACKGROUND OF THE INVENTION

Technical Field

The present invention relates to a gasket for a fuel cell. More specifically, the present invention relates to a separator-integrated gasket for a fuel cell that is integrated with a separator.

Related Art

Conventionally, many fuel cells (fuel cell stacks) mainly used for fuel cell powered vehicles and the like have been developed. Such a fuel cell stack mainly includes a stacked body configured by stacking a plurality of unit cells, and a storage body for storing the stacked body.

Further, the unit cell has an electrolyte membrane, an electrode, a gas diffusion layer, a separator, and a gasket (sealing material) as main constituent members, and supplies a fuel gas such as hydrogen from an anode side, and on the other hand, supplies an oxidizing gas such as air from a cathode side, whereby power generation is performed by a reaction between the fuel gas and the oxidizing gas. There is also known a separator-integrated gasket for a fuel cell in which a separator and a gasket are integrated.

The separator constituting a part of the unit cell forms a fluid flow path for allowing a gas (fluid) composed of a fuel gas such as hydrogen or an oxidizing gas such as air to flow therethrough. In addition, the gasket forms a sealing structure in which these fluids do not leak out of the fluid flow path.

The separator is formed by pressing a flat metal plate into a predetermined shape to form ridge-shaped beads protruding from the plate surface. Then, a pair of separators arranged on the anode side and the cathode side are superposed on each other, so that a fluid flow path surrounded by the beads opposed to each other is formed. By using the protruding reaction force, it is possible to maintain a high sealing property (sealability) for preventing leakage of fluid (see, for example, JP-A-2020-198200).

More specifically, the conventional gasket for a fuel cell 100 includes, for example, an anode-side separator 102 and a cathode-side separator 103 each having beads 101 formed thereon, and the anode-side separator 102 and the cathode-side separator 103 are superposed on each other, as shown in FIG. 11.

At this time, the bead 101 of the cathode-side separator 103 is disposed at a position opposite to the bead 101 of the anode-side separator 102, and is formed with the protruding direction in the opposite direction, with respect to the bead 101 of the anode-side separator 102. That is, by combining a pair of beads 101, a fluid flow path FC having a substantially hexagonal cross section is formed, as shown in FIG. 11. In addition, the bead connection 104 of the bead 101 is covered with the elastic rubber portion 105, and the gasket for a fuel cell 100 can maintain a higher sealing property.

In the case of the gasket for a fuel cell 100, for example, when a force is applied in a direction in which the gasket for a fuel cell 100 (in particular, the unit cell) is compressed (corresponding to the vertical directions of the sheet of FIG. 12, the load directions F1 and F2), the bead 101 tends to extend along the directions (the extending directions D1 and D2) perpendicular to the directions compressed. As a result, spring characteristics of the beads 101 are deteriorated, and the reaction force by the beads 101 becomes insufficient, which may impair the sealing property.

Therefore, a laser joining part 106 in which the anode-side separator 102 and the cathode-side separator 103 are joined by laser welding or the like is provided, so that deformation of the beads 101 against compression (see a pair of left and right arrows in FIG. 13) is suppressed and stable sealing property is exhibited (see FIG. 13).

However, in the manufacturing of the fuel cell stack, when the above-described joining process of laser-welding the anode-side separator and the cathode-side separator is required, there is a possibility that the number of manufacturing processes increases and the working time for the welding operation increases.

In particular, since it is necessary to perform laser welding for preventing such deformation at a plurality of points for one unit cell, problems such as a decrease in working efficiency and an increase in manufacturing cost may occur in the manufacturing of the fuel cell stack.

SUMMARY

In view of the above circumstances, it is an object of the present invention to provide a gasket for a fuel cell which suppresses deformation and extension of a bead caused by a compressive load to the gasket for a fuel cell, with a relatively simple configuration, and which does not cause deterioration in sealing property by exhibiting sufficient spring characteristics. In particular, it is an object of the present invention to provide a gasket for a fuel cell capable of suppressing an increase in the number of manufacturing processes such as laser welding and an increase in the working time of the welding operation, and reducing the working time and the manufacturing cost by eliminating the need for laser welding itself or reducing welding points of laser welding.

According to the present invention, a gasket for a fuel cell that solves the above problems is provided below.

[1] A gasket for a fuel cell, comprising: a first separator having a first bead; and a second separator superposed with the first separator and having a second bead formed at a position opposite to the first bead, wherein the first separator further includes a first protrusion disposed close to the first bead and protruding from a first separator front surface in the same direction as a protruding direction of the first bead, and the second separator further includes a second protrusion disposed close to the second bead, protruding from a second separator rear surface in a direction opposite to a protruding direction of the second bead, and fittable to the first protrusion.

[2] The gasket for a fuel cell according to [1], wherein a protrusion height of the first protrusion from the first separator front surface is set to be equal to or less than a bead height of the first bead from the first separator front surface.

[3] The gasket for a fuel cell according to [1] or [2], wherein the first protrusion is disposed at a position within at least 10 mm from a bead center position of the first bead.

[4] The gasket for a fuel cell according to [1], wherein a plurality of the first protrusions and the second protrusions are disposed at predetermined intervals along a longitudinal direction of the first bead and the second bead.

[5] The gasket for a fuel cell according to [1], wherein the first protrusion and the second protrusion have a tapered cross-sectional shape that protrudes obliquely with respect to a vertical direction from the first separator front surface or the second separator rear surface.

[6] The gasket for a fuel cell according to [1], wherein the first protrusion and the second protrusion in a state of being fitted to each other have a first fitting gap between a rear surface of the first protrusion and a front surface of the second protrusion along a bead longitudinal direction of the first bead and the second bead, and a second fitting gap between the rear surface of the first protrusion and the front surface of the second protrusion along a bead perpendicular direction perpendicular to the bead longitudinal direction that is set to be equal to or less than the first fitting gap.

[7] The gasket for a fuel cell according to [1], wherein the first separator and the second separator are made of a stainless-steel or titanium metal plate.

[8] The gasket for a fuel cell according to [1], further comprising a laser joining part provided at a position close to the first protrusion and the second protrusion, or the first bead and the second bead, and joining the first separator and the second separator superposed on each other by laser welding.

[9] The gasket for a fuel cell according to [1], wherein the first protrusion and the second protrusion are formed of at least one of a rectangular cross-sectional shape, a circular cross-sectional shape, and an elliptical cross-sectional shape in an upper view.

[10] The gasket for a fuel cell according to [1], wherein two or more of the second protrusions are fitted to one of the first protrusions.

[11] The gasket for a fuel cell according to [1], wherein the first separator further includes a first recess disposed close to the first bead and recessed from the first separator front surface in a direction opposite to a protruding direction of the first bead, and the second separator further includes a second recess disposed close to the second bead, recessed from the second separator rear surface in the same direction as the protruding direction of the second bead, and fittable to the first recess.

The gasket for a fuel cell of the present invention has a first protrusion of a first separator and a second protrusion of a second separator which are close to a first bead and a second bead and can be fitted to each other, and restricts the movement of the first separator and the second separator in a state in which the first separator and the second separator are superposed, so that even when a load is applied in a direction in which the gasket for a fuel cell is compressed, the extension of the first bead and the second bead can be suppressed and the stable sealing property can be maintained.

In addition, it is possible to omit the joining operation by laser welding of the first separator and the second separator for suppressing the extension of the first bead and the second bead, or to reduce the joining point.

DETAILED DESCRIPTION

Figure 1:
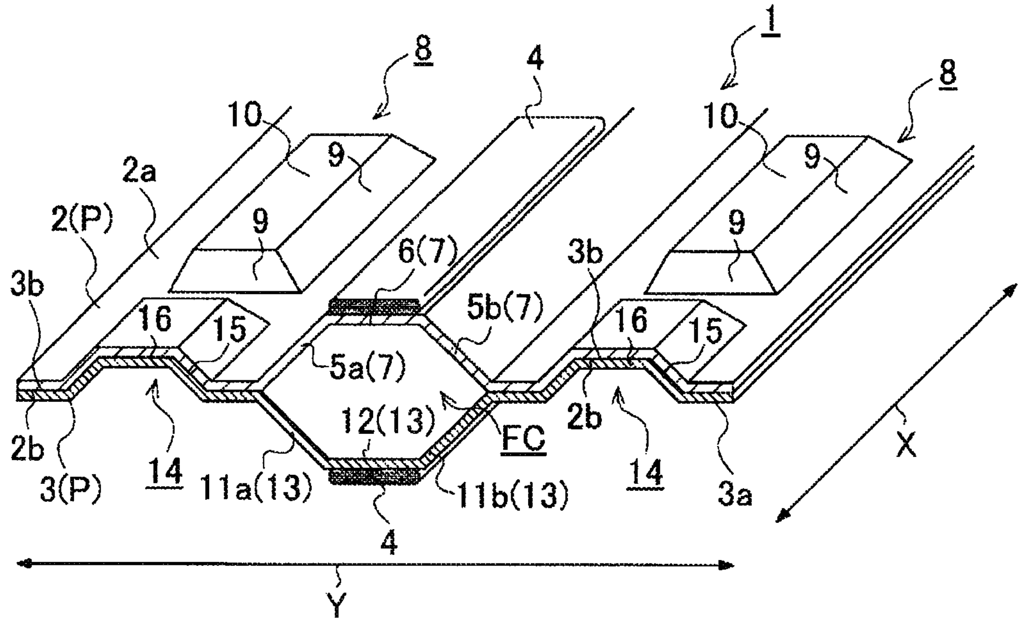
FIG. 1 is an explanatory view showing a schematic configuration of a gasket for a fuel cell according to an embodiment of the present invention.

Hereinafter, embodiments of a gasket for a fuel cell according to the present invention will be described with reference to the drawings. It should be noted that the gasket for a fuel cell of the present invention is not limited to those described below, and various changes, modifications, improvements, and the like of the design can be made without departing from the gist of the present invention.

1. Gasket for fuel cell As shown mainly in FIGS. 1 to 5, the gasket for a fuel cell 1 (hereinafter, simply referred to as the "gasket 1") according to an embodiment of the present invention is configured as a part of a unit cell (not shown) of a fuel cell stack, and includes a first separator 2, a second separator 3, and elastic rubber portions 4 attached to the first separator 2 and the second separator 3, respectively.

The first separator 2 is formed by press-forming a flat metal plate P and bending so as to have a predetermined shape defined in advance. When the plate longitudinal direction of the metal plate P (corresponding to the horizontal direction of the sheet of FIG. 2) is made into a reference, the first separator 2 has a first bead 7 having a pair of first bead leg parts 5*a* and 5*b* which are bent obliquely upward from the first separator front surface 2*a* and inclined, and a first bead connection 6 that connects between one ends of the pair of first bead leg parts 5*a* and 5*b* and is parallel along the first separator front surface 2*a*, and having a protruding cross-sectional shape (see FIG. 2), and a first protrusion 8 disposed close to the first bead 7 and protruding from the first separator front surface 2*a* in the same direction as the protruding direction of the first bead 7.

Further, in the gasket 1 of the present embodiment, the elastic rubber portion 4 described above is attached by a known method so as to cover the surface of the first bead connection 6 of the first bead 7. Here, as the metal plate P, for example, various metal plates such as a stainless-steel plate or a titanium plate can be employed.

More specifically, the first protrusion 8 has a pair of first protrusion inclined parts 9 which are bent obliquely upward from the first separator front surface 2*a* and inclined, and a first protrusion connection 10 that connects between one ends of the pair of first protrusion inclined parts 9 and is parallel along the first separator front surface 2*a,* and has a protruding cross-sectional shape, in the same manner as the first bead 7 described above.

At this time, a protrusion height H1 (see FIG. 2) indicating the height from the first separator front surface 2*a* to the first protrusion connection 10 of the first protrusion 8 is set to be equal to or less than a bead height H2 (see FIG. 2) indicating the height from the first separator front surface 2*a* to the first bead connection 6 of the first bead 7. That is, it is set so as to satisfy the relation of "bead height H2>protrusion height H1".

Further, the first protrusion 8 is set such that the first protrusion inclined part 9 or the first protrusion connection 10 is disposed at a close position at least within 10 mm from the bead center position C (see FIG. 2) of the first bead 7. That is, the distances L1 and L2 (see FIG. 2) from the bead center position C to the first protrusion 8 are set to be at least 10 mm or less.

As described above, the protrusion height H1 of the first protrusion 8 is defined with reference to the bead height H2 of the first bead 7, and the first protrusion 8 is disposed in the ranges of the distances L1 and L2 close to the first bead 7.

On the other hand, the second separator 3 is formed by press-forming a flat metal plate P and bending so as to have a predetermined shape defined in advance, similarly to the first separator 2. When the plate longitudinal direction of the metal plate P (corresponding to the horizontal direction of the sheet of FIG. 2) is made into a reference, the second separator 3 has a second bead 13 having a pair of second bead leg parts 11*a* and 11*b* which are bent obliquely downward from the second separator front surface 3*a* and inclined, and a second bead connection 12 that connects between one ends of the pair of second bead leg parts 11*a* and 11*b* and is parallel along the second separator front surface 3*a,* and having a reverse protruding cross-sectional shape (see FIG. 2), and a second protrusion 14 disposed close to the second bead and protruding from the second separator rear surface 3*b* in the opposite direction of the protruding direction of the second bead 13. Similarly to the first separator 2, the elastic rubber portion 4 is attached so as to cover the surface of the second bead connection 12 of the second bead 13.

Here, the second bead 13 of the second separator 3 is disposed at a position opposite to the second bead 13 of the first separator 2 superposed on the second separator 3, and has a protruding direction different from that of the first bead 7. That is, they are formed symmetrically about the plate longitudinal direction of the metal plate P.

More specifically, the second protrusion 14 has a pair of second protrusion inclined parts 15 which are bent obliquely upward from the second separator rear surface 3*b* and inclined, and a second protrusion connection 16 that connects between one ends of the pair of second protrusion inclined part 15 and is parallel along the second separator rear surface 3*b,* and has a protruding cross-sectional shape.

At this time, the protrusion height (not shown) of the second protrusion 14 from the second separator rear surface 3*b* and the distance (not shown) from the first bead 7 and the second bead 13 are determined by the protrusion height H1 of the first protrusion 8 to be fitted and the distances L1 and L2.

With the above configuration, the first separator 2 and the second separator 3 are superposed on each other, so that a fluid flow path FC that is a space having a substantially hexagonal cross-sectional shape surrounded by the first bead 7 and the second bead 13 protruding in different directions is formed (see FIG. 2), and various fluids (gases) such as fuel gas such as hydrogen and oxidizing gas such as air can be caused to flow through the fluid flow path FC.

At this time, when the first separator 2 and the second separator 3 are superposed on each other, the second protrusion 14 is fitted to the first protrusion 8 of the first separator 2. That is, at least a part of the first separator rear surface 2*b* side of the first protrusion 8 and the second separator rear surface 3*b* of the second protrusion 14 come into contact with each other (see FIGS. 1 and 2).

Figure 12:
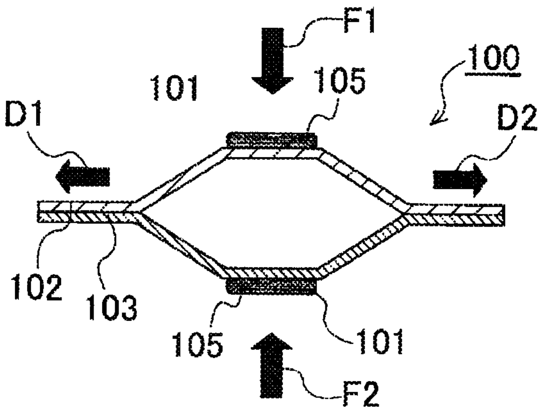
FIG. 12 PRIOR ART
FIG. 12 is an explanatory view showing a deformation of the bead due to the compressive load of a conventional gasket for a fuel cell.
Figure 13:
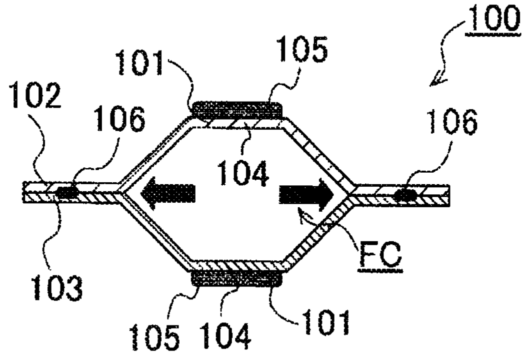
FIG. 13 PRIOR ART
FIG. 13 is an explanatory view showing the position of a laser joining part of a conventional gasket for a fuel cell.

Accordingly, even when a load (see FIG. 12) is applied from the direction in which the gasket 1 is compressed (corresponding to the vertical directions of the sheet of FIGS. 1 and 2), deformation of the first bead 7 of the first separator 2 and the second bead 13 of the second separator 3 to extend along the plate longitudinal direction due to the fitting of the first protrusion 8 and the second protrusion 14 can be suppressed. As a result, it is possible to maintain the stable sealing property of the gasket 1 using the reaction force of the first bead 7 and the second bead 13.

In particular, as described above, by disposing the first protrusion 8 within 10 mm close to the first bead 7 and setting the protrusion height H1 of the first protrusion 8 to be at least equal to or less than the bead height H2 of the first bead 7, it is possible to more reliably stabilize the sealing property described above.

Figure 2:
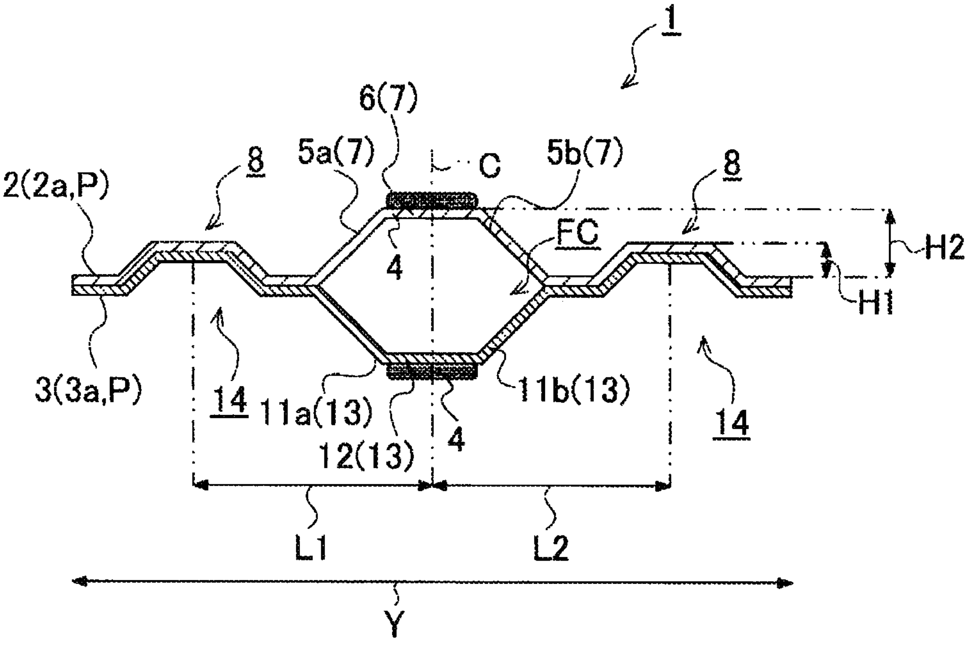
FIG. 2 is a cross-sectional view of a front view showing a schematic configuration of a gasket for a fuel cell of the present embodiment.
Figure 3:
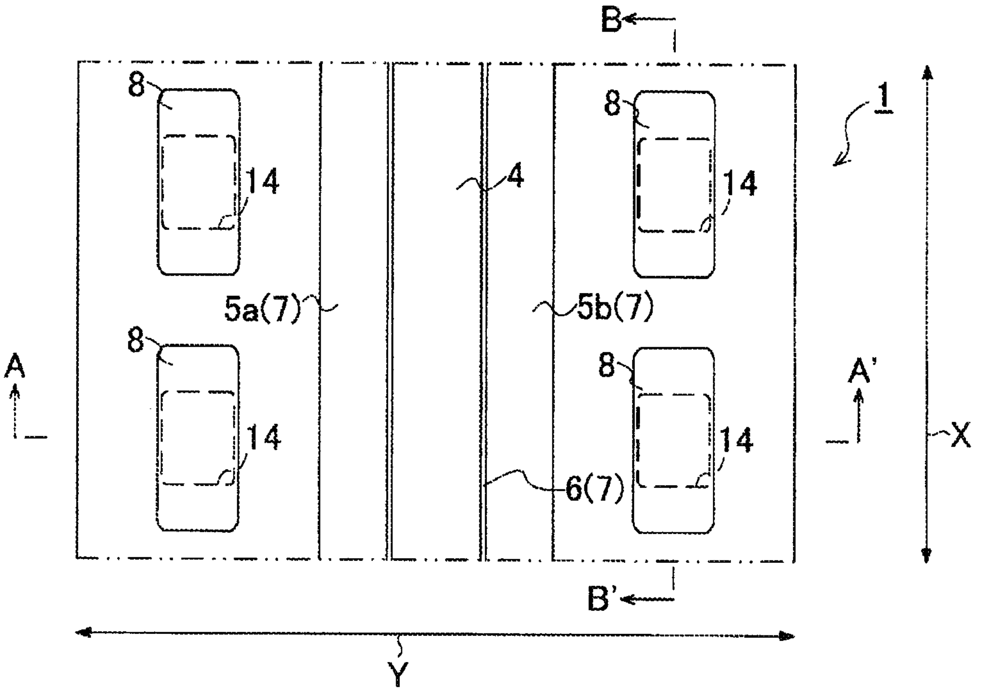
FIG. 3 is a plan view of an upper view showing a schematic configuration of a gasket for a fuel cell of the present embodiment.
Figure 4:
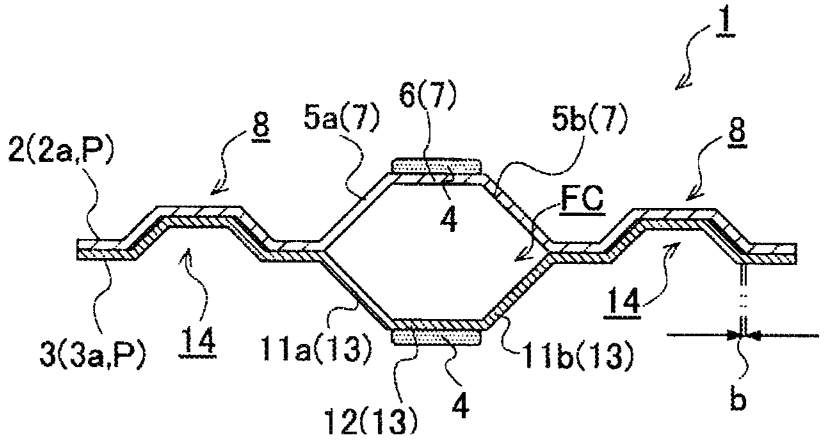
FIG. 4 is a cross-sectional view taken along a line A-A' in FIG. 3 for showing a first fitting gap.
Figure 5:
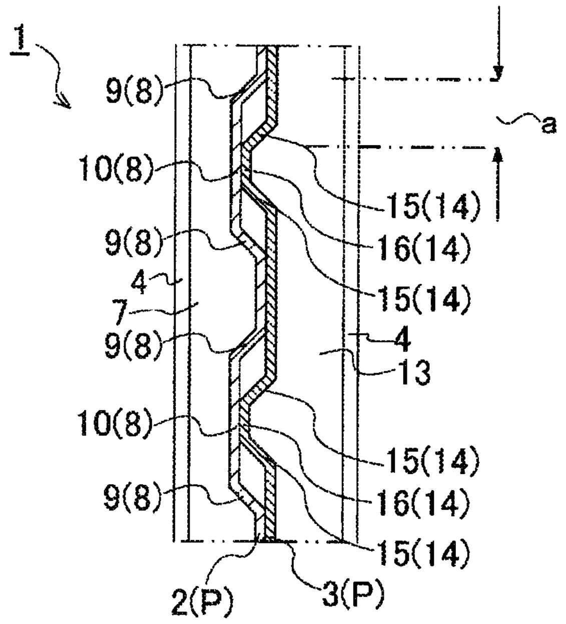
FIG. 5 is a cross-sectional view taken along a line B-B' in FIG. 3 for showing a second fitting gap.

In addition, in the gasket 1 of the present embodiment, a plurality of first protrusions 8 and a plurality of second protrusions 14 fittable to the first protrusions 8 are disposed at predetermined intervals along the bead longitudinal direction X of the first bead 7 and the second bead 13 (see FIG. 1, corresponding to the front to depth direction of the sheet of FIG. 2).

As described above, the plurality of first protrusions 8 and the like are discontinuously disposed at predetermined intervals along the bead longitudinal direction X, so that the first bead 7 and the like are less likely to be deformed even when a load is applied in a direction in which the gasket 1 is compressed. As long as sufficient bead characteristics can be obtained, the first protrusion 8 and the like may be continuously formed along the bead longitudinal direction as in the case of the first bead 7 and the like.

Further, as described above, the first protrusion 8 and the second protrusion 14 of the gasket 1 of the present embodiment have the first protrusion inclined parts 9 which are bent obliquely upward from the first separator front surface 2*a* and inclined, and the second protrusion inclined parts 15 which are bent obliquely upward from the second separator rear surface 3*b* and inclined.

That is, with respect to the width between the lower ends of the first protrusion inclined parts 9 (or the second protrusion inclined parts 15), the width between the upper ends of the first protrusion inclined parts 9 (or the second protrusion inclined parts 15) (corresponding to the length of the first protrusion connection 10 or the second protrusion connection 16) is formed so as to be short.

As a result, the first protrusion 8 and the second protrusion 14 are formed to have a tapered cross-sectional shape in a cross section in a square view or a side view. More specifically, the first protrusion 8 and the second protrusion 14 are protruded so as to incline with respect to the vertical direction from first separator front surface 2*a* in which the first protrusion 8 is protruded or the second separator rear surface 3*b* in which the second protrusion 14 is protruded. By forming the first protrusion 8 and the like in a tapered cross-sectional shape as described above, the first separator 2 and the second separator 3 are superposed on each other, and deformation at the time of fitting the first protrusion 8 and the second protrusion 14 and at the time of compression can be suppressed.

Further, in the gasket 1 of the present embodiment, in the first protrusion 8 and the second protrusion 14 fitted to each other, with respect to the first fitting gap a (see FIG. 5) between the rear surface of the first protrusion 8 along the bead longitudinal direction X of the first bead 7 and the second bead 13 (on the first separator rear surface 2*b* side) and the front surface of the second protrusion 14 (on the second separator rear surface 3*b* side), the second fitting gap b (see FIG. 4) between the rear surface of the first protrusion 8 and the front surface of the second protrusion 14 along the bead perpendicular direction Y perpendicular to the bead longitudinal direction X is set to be equal to or less than the first fitting gap a. That is, it is set so as to satisfy the relation of "first fitting gap a ≥second fitting gap b".

In order to suppress deformation extending along the horizontal direction of the first bead 7 and the like, the second fitting gap b is set to be as small as possible, so that deformation of the first bead 7 and the like can be suppressed more reliably. On the other hand, since the deformation in the bead longitudinal direction X is not so large, the first fitting gap a may be relatively large.

As described above, in the gasket 1 of the present embodiment, the first protrusion 8 is provided at a position close to the first bead 7 of the first separator 2, and the second protrusion 14 is provided on the second separator 3 so as to be fitted to the first protrusion 8, whereby it is possible to reliably suppress deformation of the first bead 7 and the like when the first separator 2 and the second separator 3 are superposed.

2. Gasket (Gasket for fuel cell) with another exemplary configuration The gasket of the present invention is not limited to the above-described configuration, and may have, for example, various configurations described below. In the gaskets having another exemplary configuration described below, those having the same configuration as the gasket 1 of the present embodiment described above are denoted by the same reference numerals, and a detailed description thereof will be omitted below.

Figure 6:
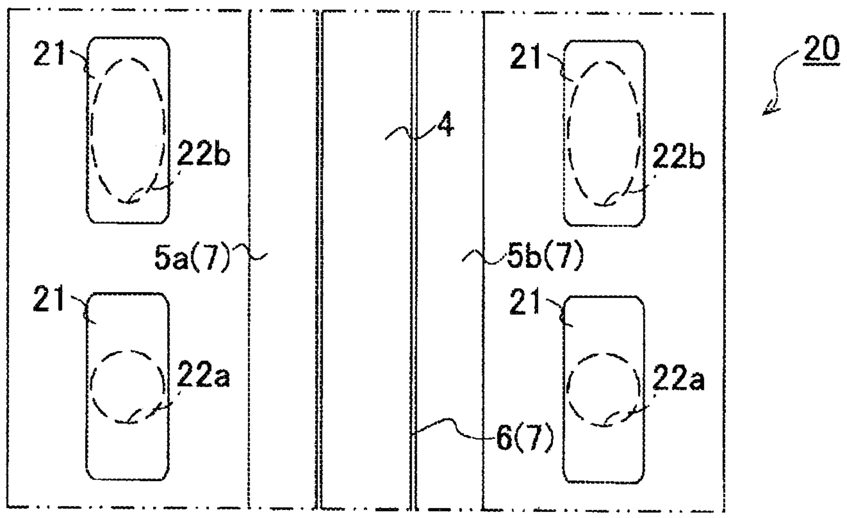
FIG. 6 is an explanatory view of an upper view showing a cross-sectional shape of a first protrusion and a second protrusion of a gasket for a fuel cell with another exemplary configuration (1) of the present invention.

2.1 Gasket with another exemplary configuration (1) As shown in FIG. 6, the gasket 20 having the another exemplary configuration (1) is configured to include a second protrusion 22*a* having a circular cross-sectional shape in an upper view and a second protrusion 22*b* having an elliptical cross-sectional shape in an upper view, with respect to a first protrusion 21 having a rectangular cross-sectional shape (substantially rectangular shape) in an upper view.

That is, the shape of the second protrusion is not particularly limited as long as it can be fitted to the first protrusion 21, and the first protrusion 8 and the second protrusion 14 as shown in the gasket 1 of the present embodiment may not have a similar shape. Although the second protrusions 22*a* and 22*b* having a circular cross-sectional shape or an elliptical cross-sectional shape are shown with respect to the first protrusion 21 having a rectangular cross-sectional shape, the first protrusion 21 may be changed to a circular cross-sectional shape or the like.

Even when the first protrusion 21 and the second protrusions 22*a* and 22*b* have different shapes as in the gasket 20 with the another exemplary configuration (1), deformation of the first bead 7 can be sufficiently suppressed, and an operation process such as laser welding can be omitted.

Figure 7:
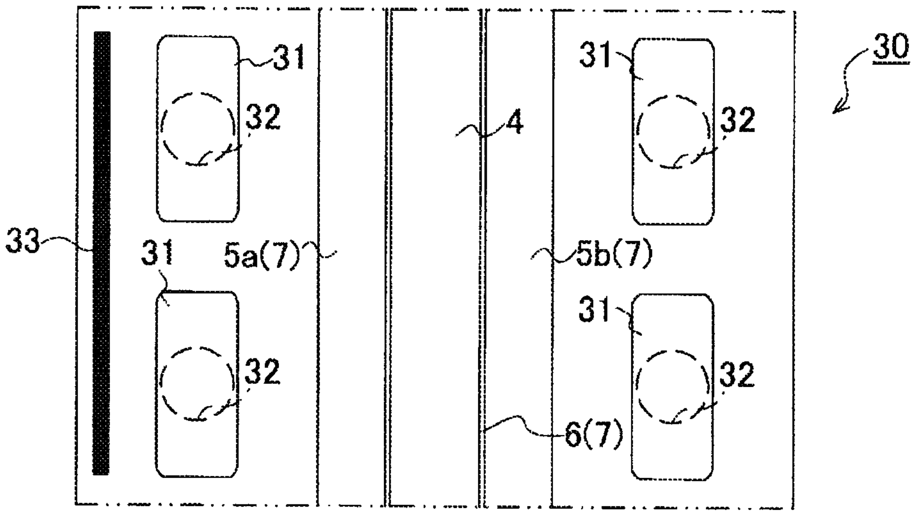
FIG. 7 is an explanatory view of an upper view showing the position of a laser joining part of a gasket for a fuel cell with another exemplary configuration (2) of the present invention.

2.2 Gasket 30 with another exemplary configuration (2) As shown in FIG. 7, the gasket 30 having the another exemplary configuration (2) is configured to include the laser joining part 33 at a position close to the first protrusion 31 and the second protrusion 32 having a circular cross-sectional shape and fitted to the first protrusion 31, more specifically, at a position opposite to the first bead 7.

That is, by using a conventionally known technique of joining separators, the first separator 2 and the second separator (not shown) can be firmly joined, and the deformation of the first bead 7 can be further reliably suppressed. In addition, although the operation process such as laser welding cannot be omitted, it is possible to significantly reduce the joining points at which the laser joining part 33 is provided, by the effect of the fitting of the first protrusion 31 and the second protrusion 32, as compared with the prior art. Therefore, it has effects of reducing the working time and reducing the manufacturing cost.

Figure 8:
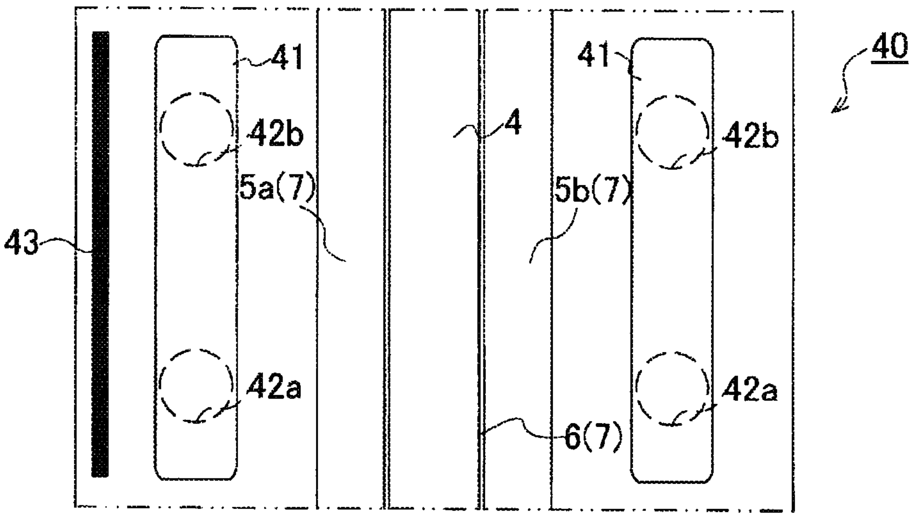
FIG. 8 is an explanatory view of an upper view showing a fitting state of a first protrusion and a second protrusion of a gasket for a fuel cell with another exemplary configuration (3) of the present invention.

2.3 Gasket with another exemplary configuration (3) As shown in FIG. 8, the gasket 40 having the another exemplary configuration (3) is a gasket in which two second protrusions 42*a* and 42*b* having a circular cross-sectional shape are fitted to one first protrusion 41 having a rectangular cross-sectional shape. Further, the laser joining part 43 shown in the another exemplary configuration (2) is provided at a position close to the first protrusion 41.

That is, two or more second protrusions 42*a* and 42*b* may be fitted to one first protrusion 41. As a result, the fitting state between the first protrusion 41 and the second protrusions 42*a* and 42*b* becomes more reliable, and the deformation of the first bead 7 can be suppressed more effectively.

Figure 9:
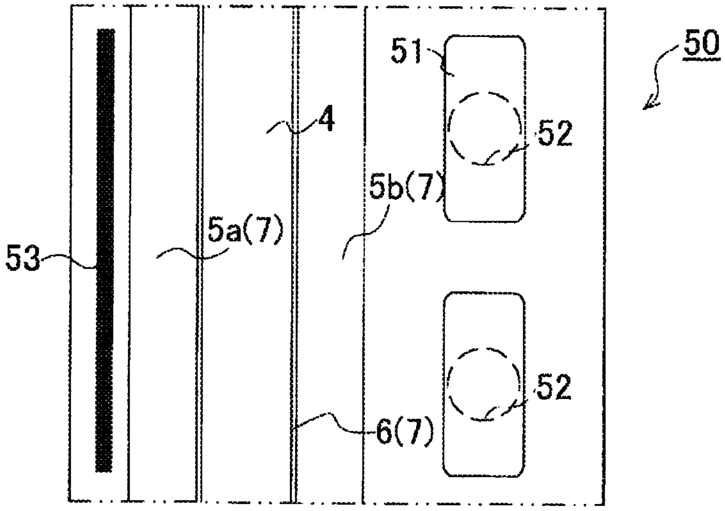
FIG. 9 is an explanatory view of an upper view showing the positions of a first protrusion, a second protrusion, and a laser joining part of the gasket for a fuel cell with another exemplary configuration (4) of the present invention.

2.4 Gasket with another exemplary configuration (4) As shown in FIG. 9, the gasket 50 having the another exemplary configuration (4) is configured to include the laser joining part 53 at a position close to the first bead 7, more specifically, at a position opposite to the first protrusion 51 and the second protrusion 52. That is, the gasket 50 is provided with a fitting point consisting of the first protrusion 51 and the second protrusion 52 on one side of the first bead 7 (the right side of the sheet of FIG. 9) and a laser joining part 53 on the other side of the first bead 7, and is formed by sandwiching the first bead 7 by the first protrusion 51 and the second protrusion 52, and the laser joining part 53.

That is, by combining the fitting of the first protrusion 51 and the second protrusion 52 with the laser joining part 53, deformation of the first bead 7 can be suppressed.

Figure 10:
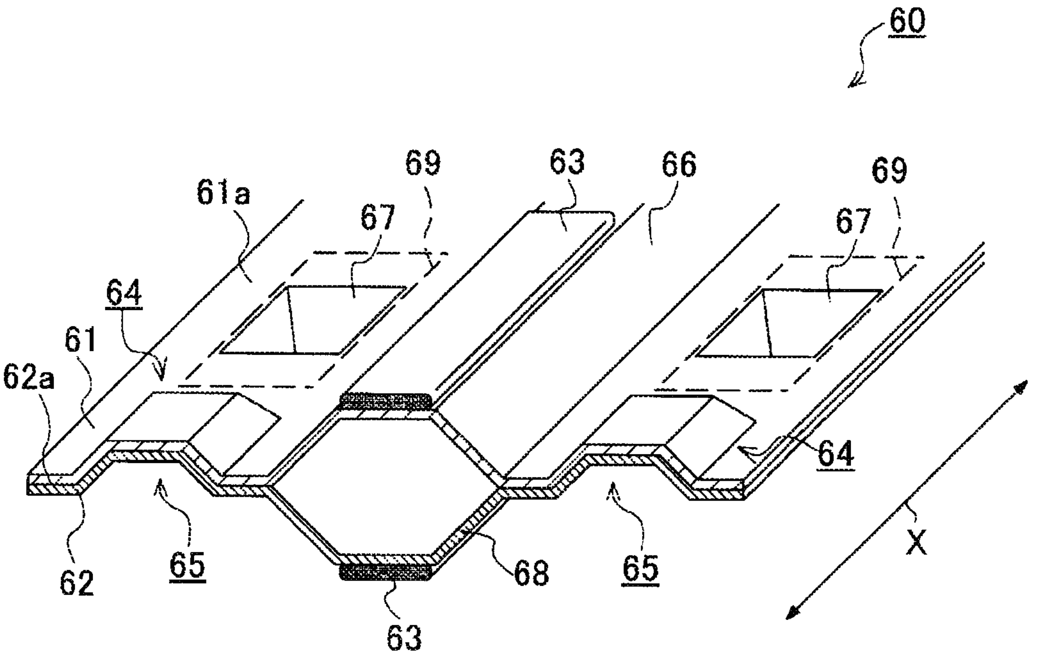
FIG. 10 is an explanatory view showing the positions of a first recess and a second recess of a gasket for a fuel cell with another exemplary configuration (5) of the present invention.
Figure 11:
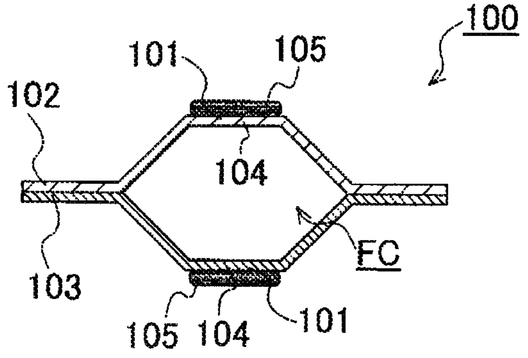
FIG. 11 PRIOR ART
FIG. 11 is an explanatory view showing a schematic configuration of a conventional gasket for a fuel cell.

2.5 Gasket with another exemplary configuration (5) As shown in FIG. 10, the gasket 60 having the another exemplary configuration (5) is configured to mainly include the first separator 61, the second separator 62, and an elastic rubber portion 63 attached to the first separator 61 and the second separator 62, the first separator 61 is provided with the first protrusion 64 already shown, and the second separator 62 is provided with the second protrusion 65 already shown, respectively.

Further, the first separator 61 has a first recess 67 disposed at predetermined intervals along the bead longitudinal direction X from the first protrusion 64, disposed close to the first bead 66, and recessed from the first separator front surface 61*a* in a direction that differs from the protruding direction of the first bead 66.

On the other hand, the second separator 62 has a second recess 69 disposed close to the second bead 68, recessed from the second separator rear surface 62*a* in the same direction as the protruding direction of the second bead 68, and fittable to the first recess 67.

That is, the gasket 60 with the another exemplary configuration (5) has the first recess 67 protruded in the direction opposite (recessed) to the protruding direction of the first protrusion 64 and the second protrusion 65, which are the configurations described above, and the second recess 69 fittable to the first recess 67. The configurations and the effects of the first recess 67 and the second recess 69 are different only in the protruding direction (recessed direction), but are substantially the same, and therefore description thereof will be omitted here.

Since the gasket 60 with the another exemplary configuration (5) has the effect of the fitting of the first recess 67 and the second recess 69 in addition to the effect of the fitting of the first protrusion 64 and the second protrusion 65, the deformation of the first bead 66 can be further suppressed.

As described above, the gaskets 20, 30, 40, 50, and 60 having another exemplary configurations (1) to (5) of the present invention have slightly structural difference from the gasket 1 of the present embodiment described above, but are similar in basic configuration, and can suppress extension and deformation of the first bead 7 and the like with respect to the compressive load to the gasket 20 and the like and maintain stable sealing property.

Therefore, the deformation of the first bead 7 and the like can be efficiently and reliably suppressed by selecting the gasket 1 and the like in an appropriate manner according to the magnitude of the compressive load applied to the first bead 7 and the like when the first separator 2 and the second separator 3 are superposed. That is, the gasket 1 of the present embodiment and the gaskets 20, 30, 40, 50, and 60 shown as another exemplary configurations can be suitably used as a gasket for a fuel cell.

INDUSTRIAL APPLICABILITY

The gasket for a fuel cell of the present invention can be suitably used in the manufacture of a fuel cell used in a fuel cell vehicle or the like.

What is claimed is:

1. A gasket for a fuel cell, comprising:

a first separator having a first bead that extends in a longitudinal direction; and a second separator superposed with the first separator and having a second bead that extends in the longitudinal direction and is formed at a position opposite to the first bead, wherein the first separator further includes a first protrusion disposed close to the first bead in a lateral direction that is arranged orthogonal to the longitudinal direction, and protruding from a first separator front surface in the same direction as a protruding direction of the first bead, the second separator further includes a second protrusion disposed close to the second bead in the lateral direction that is arranged orthogonal to the longitudinal direction, protruding from a second separator rear surface in a direction opposite to a protruding direction of the second bead, and fittable to the first protrusion, and a plurality of the first protrusions and the second protrusions are disposed at predetermined intervals along the longitudinal direction of the first bead and the second bead.

2. The gasket for a fuel cell according to claim 1, wherein a protrusion height of the first protrusion from the first separator front surface is set to be equal to or less than a bead height of the first bead from the first separator front surface.

3. The gasket for a fuel cell according to claim 1, wherein the first protrusion is disposed at a position within at least 10 mm in the lateral direction from a bead center position of the first bead.

4. The gasket for a fuel cell according to claim 1, wherein the first protrusion and the second protrusion have a tapered cross-sectional shape that protrudes obliquely with respect to a vertical direction from the first separator front surface or the second separator rear surface.

5. The gasket for a fuel cell according to claim 1, wherein the first protrusion and the second protrusion in a state of being fitted to each other have a first fitting gap between a rear surface of the first protrusion and a front surface of the second protrusion along a bead longitudinal direction of the first bead and the second bead, and a second fitting gap between the rear surface of the first protrusion and the front surface of the second protrusion along a bead perpendicular direction perpendicular to the bead longitudinal direction that is set to be equal to or less than the first fitting gap.

6. The gasket for a fuel cell according to claim 1, wherein the first separator and the second separator are made of a stainless-steel or titanium metal plate.

7. The gasket for a fuel cell according to claim 1, further comprising a laser joining part provided at a position close to the first protrusion and the second protrusion, or the first bead and the second bead, and joining the first separator and the second separator superposed on each other by laser welding.

8. The gasket for a fuel cell according to claim 1, wherein the first protrusion and the second protrusion are formed of at least one of a rectangular cross-sectional shape, a circular cross-sectional shape, and an elliptical cross-sectional shape in an upper view.

9. The gasket for a fuel cell according to claim 1, wherein two or more of the second protrusions are fitted to one of the first protrusions.

10. The gasket for a fuel cell according to claim 1, wherein the first separator further includes a first recess disposed close to the first bead and recessed from the first separator front surface in a direction opposite to a protruding direction of the first bead, and the second separator further includes a second recess disposed close to the second bead, recessed from the second separator rear surface in the same direction as the protruding direction of the second bead, and fittable to the first recess.

* * * * *